US006863024B1

(12) United States Patent
Obenshain

(10) Patent No.: US 6,863,024 B1
(45) Date of Patent: Mar. 8, 2005

(54) CONVERTIBLE SEED PORT FOR BIRD FEEDER

(75) Inventor: James Roberts Obenshain, Peebles, OH (US)

(73) Assignee: Cedar Works, LLC, Peebles, OH (US)

( * ) Notice: Subject to any disclaimer, the term of this patent is extended or adjusted under 35 U.S.C. 154(b) by 45 days.

(21) Appl. No.: 10/770,625

(22) Filed: Feb. 4, 2004

(51) Int. Cl.[7] .......................... A01K 39/00; A01K 61/02
(52) U.S. Cl. .................. 119/57.8; 119/52.2; 119/51.01
(58) Field of Search ........................... 119/51.01, 52.1, 119/52.2, 53, 57.8; D30/124, 127

(56) References Cited

U.S. PATENT DOCUMENTS

| | | | | |
|---|---|---|---|---|
| 4,974,547 A | * | 12/1990 | Graham ..................... | 119/52.2 |
| 5,215,039 A | * | 6/1993 | Bescherer ................... | 119/57.8 |
| D352,575 S | * | 11/1994 | Bransky et al. ............ | D30/127 |
| 5,701,841 A | * | 12/1997 | Fasino ........................ | 119/52.2 |
| 6,305,321 B1 | * | 10/2001 | Potente ....................... | 119/52.2 |
| 6,408,788 B1 | * | 6/2002 | Lieb et al. .................. | 119/52.2 |

* cited by examiner

Primary Examiner—Teri P. Luu
Assistant Examiner—Elizabeth Shaw
(74) Attorney, Agent, or Firm—Neal O. Willmann

(57) ABSTRACT

A seed port offering the option of selectively dispensing only small seeds from a reservoir-type bird feeder, comprises a carriage supporting a framing flange corresponding to the opening in the reservoir, a removable baffle to limit the flow of seeds from the reservoir, and a disk member that is optionally inserted within the framing flange, in the absence of the baffle, to selectively limit access to only smaller seeds through a defined opening in the disk.

3 Claims, 3 Drawing Sheets

CONVERTIBLE SEED PORT FOR BIRD FEEDER

BACKGROUND OF THE INVENTION

This disclosure relates generally to bird feeders. More specifically, it relates to a seed port that is designed to accommodate and to permit dispensing a variety of seeds from a reservoir-type bird feeder. Typically, to attract a variety of birds to a feeding area, it is recommended that a variety of seeds be provided. The disclosed seed port, when configured in one of two modes, will permit the dispensing of a conventional mix of large and small seeds, and when configured in a second mode, will permit only the dispensing of smaller seeds, that traditionally attract specific and smaller birds.

DESCRIPTION OF THE PRIOR ART

Relevant to the bird seed port described and claimed herein is the Bi-Modal Seed Port of U.S. Pat. No. 6,408,788, which issued to Lieb et al. on Jun. 25, 2002. Lieb et al.'s bi-modal port is designed to permit dispensing large and small seeds from the same feeder. It features a trough with a hinged lid having a small opening that will alternatively deny access to the trough while permitting access to seeds in the reservoir; or deny access to seeds in the reservoir while permitting access to seeds in the trough.

SUMMARY OF THE INVENTION

Basically, what is disclosed and claimed herein is a seed port for use with a bird feeder consisting essentially of a reservoir filled with seed for feeding birds. When inserted into an opening in the side of the reservoir the seed port will provide access to the seeds in the reservoir. However, this particular seed port offers the option and is convertible to provide access to only small seeds within the reservoir. In other words, the disclosed seed port has structural features, which in one mode; will permit access to any and all seeds within the reservoir, and in another mode provide access to only smaller seeds. This limited access to only smaller seeds is defined by an aperture in an insertable disk, one of the structural features of the disclosed seed port.

Structurally, the disclosed seed port comprises a carriage member that is insertable into the reservoir through an opening in the side of the reservoir. The carriage member has a framing flange that defines the size of an opening in the carriage member and is larger than the opening in the reservoir to limit the full or complete insertion of the carriage member into the reservoir. The carriage member may also have an attachment means to provide for semi-permanent association with the reservoir or, preferably, other seed ports in a paired relationship. The seed port also has a baffle guide attached to the framing flange and positioned above and within the opening in the carriage member. Associated with the baffle guide is a baffle, insertable in the baffle guide, having a shoulder positioned to impact the framing flange of the carriage member to prevent full insertion of the baffle into the reservoir. And, associated with the framing flange of the carriage member is a disk member that conforms in size and shape to the framing flange, and wherein the disk has a generally centered opening to permit access to only small seeds within the reservoir, said disk fitting within the framing flange in the absence of the baffle.

DESCRIPTION OF THE PREFERRED EMBODIMENT

Figure 1:
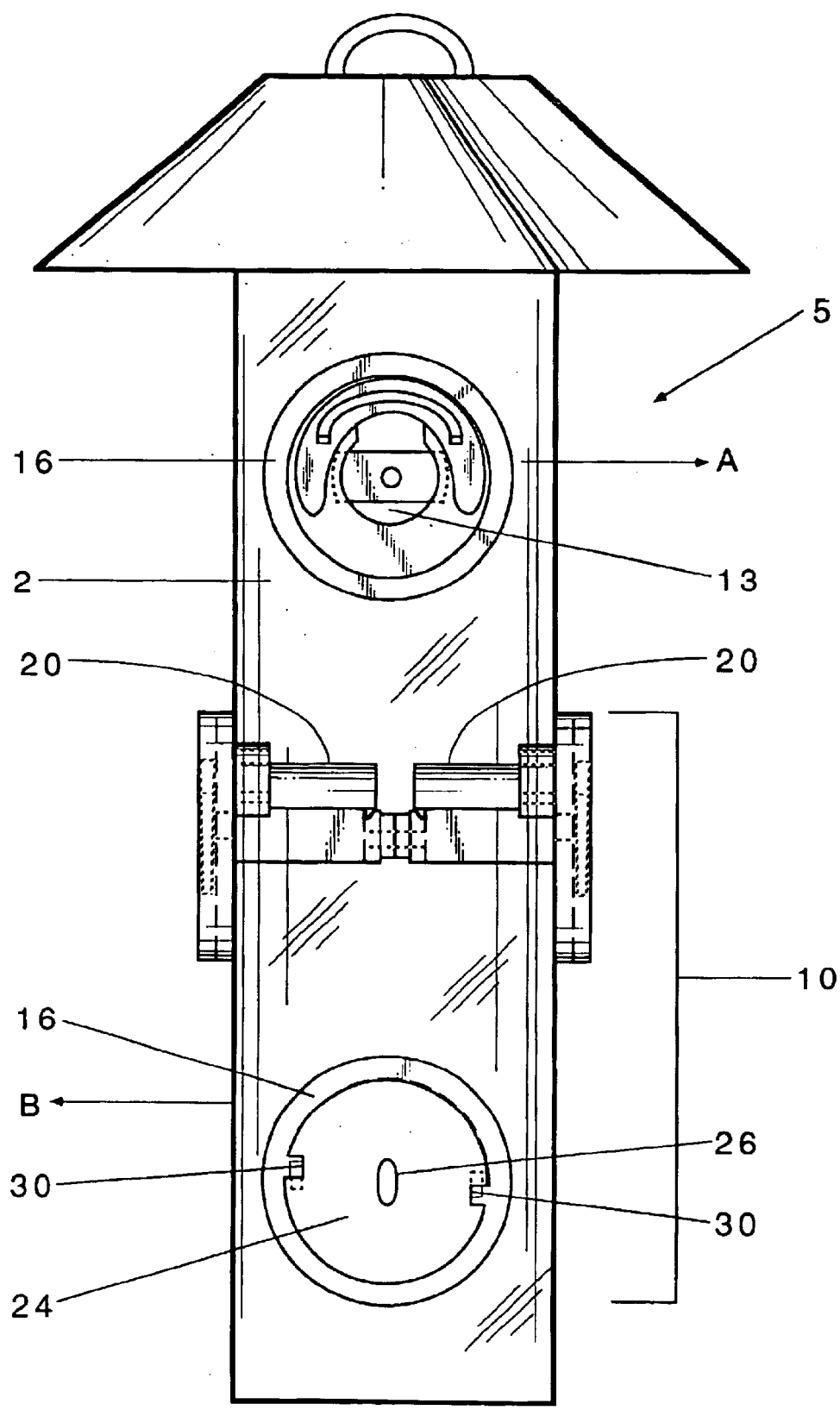
FIG. 1 is an elevated side view of a bird feeder equipped with frontal and side views of the convertible seed port in modes A and B.

The disclosed seed port 10 can be best understood and appreciated by referring to the drawing. In FIG. 1 of the drawing the seed port 10 is depicted installed in the reservoir 2 of a traditional bird feeder 5 in both of its two modes: A and B. In the A mode the seed port features the fully inserted baffle element 20 (FIG. 2), which will facilitate the dispensing of large, small and a mixture of all seeds typically dispensed in a bird feeder. In the B mode the seed port features the disk member 24, which is positioned on the seed port in lieu of the baffle element, and functions to dispense only smaller seeds in accordance with the relatively small opening 26 located generally in the center of the disk 24.

FIG. 1 also depicts a pair of the disclosed seed ports (in the A mode) secured within the reservoir by attachment to each other. This secured and paired relationship is the preferred means of associating and fixing the seed ports to the reservoir of a bird feeder.

Figure 4:
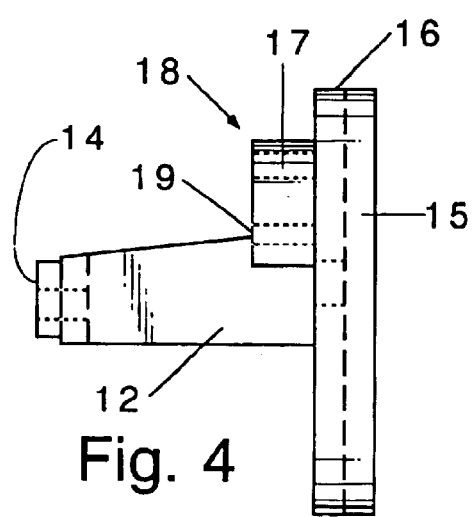
FIG. 4 is a side view of the carriage member of the seed port.
Figure 5:
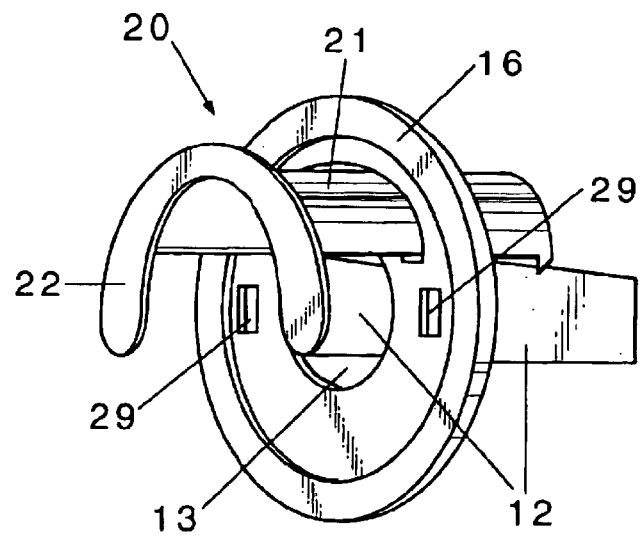
FIG. 5 is a perspective view of the carriage member with the baffle element partially inserted.
Figure 6:
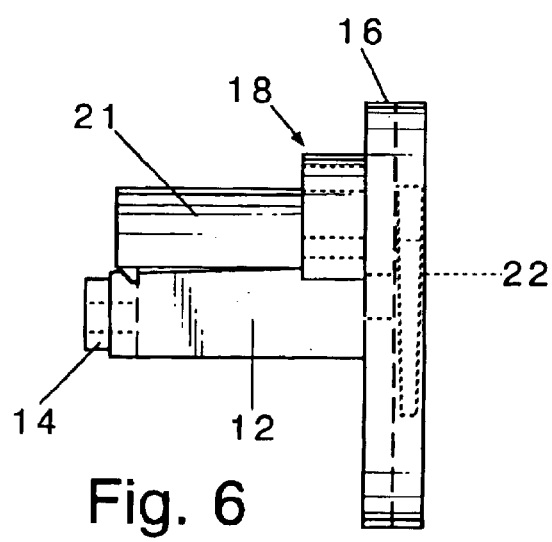
FIG. 6 is a side view of the carriage member of the seed port with the baffle element fully inserted.

More detail of the seed port is presented in FIG. 5. In this depiction, the seed port is in the process of being fitted in mode A. Clearly depicted in FIG. 5 is the seed port carriage 12, which supports a framing flange 16 and attachment means 14 (FIGS. 4 and 6). The framing flange defines the opening 13 in the seed port, which is to be congruent with the opening in the reservoir. The framing flange thus frames both the opening in the seed port and the corresponding opening in the reservoir, and, of course is larger than the opening in the reservoir to prevent full insertion of the seed port into the reservoir. The seed port carriage 12 extends from the framing flange 16 and extends into the reservoir where it terminates in an attachment means 14. In the preferred embodiment of the disclosed seed port, the attachment means of one seed port can be paired with the attachment means of another seed port and secured, one to the other, with a simple fastener. It is also contemplated that these attachment means could be fashioned from any of a variety of interlocking or mating mechanisms.

Figure 2:
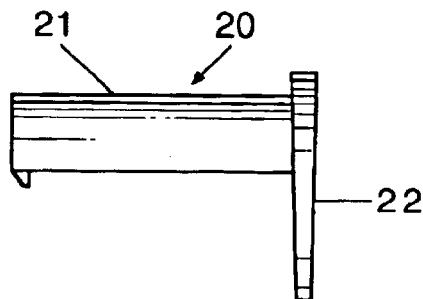
FIG. 2 is a side view of the baffle element.
Figure 3:
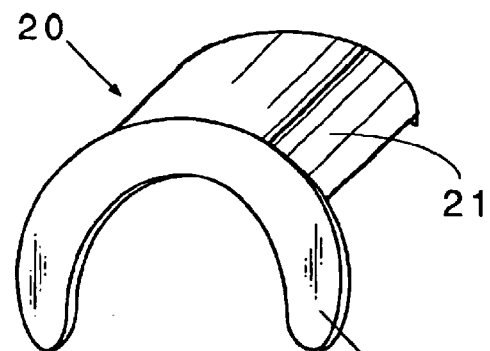
FIG. 3 is a perspective view of the baffle element clearly illustrating its shoulder.

When the seed port is configured in mode A to accommodate larger and/or a mixture of seed sizes, the carriage 12 of the seed port 10 is fitted with a baffle element 20. FIGS. 2 and 3 illustrate the baffle element. The baffle element consists of two structures, the roof 21 and the shoulder 22. The purpose of the baffle is to support and deflect the seeds in the reservoir directly above the seed port. When the baffle is fully inserted (mode A) the flow of seeds to the opening 13 in the seed port is modulated and the free flow of seeds out of the port and onto the ground is essentially curtailed.

For the seed port to be properly fitted with the baffle 20, the carriage 12 preferably features a baffle guide 18. FIG. 4 shows the carriage and the guide 18 without the insertion of the baffle element 20, and FIG. 6 shows the carriage and the guide 18 with the baffle element 20 in place and fully inserted.

Figure 7:
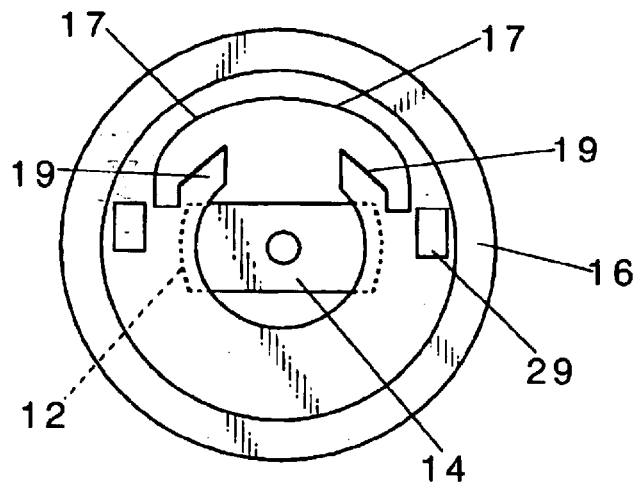
FIG. 7 is an elevated frontal view of the carriage member of the seed port.
Figure 8:
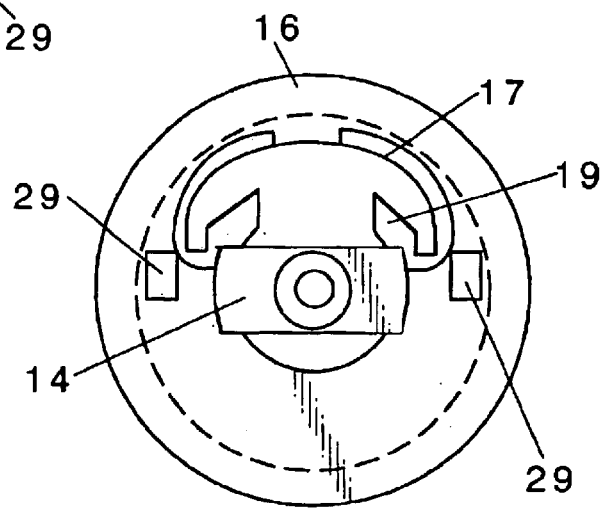
FIG. 8 is an elevated back view of the carriage member of the seed port.
Figure 9:
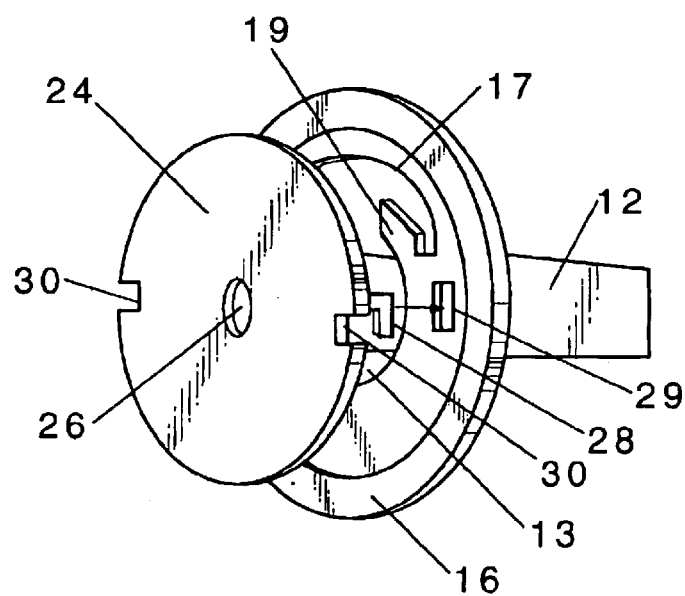
FIG. 9 is an elevated side view of the disk depicting its orientation prior to placement in the framing flange of the carriage member.

The elements of the baffle guide 18 are more readily apparent in FIGS. 7 and 8. In FIG. 7, an elevated frontal view of the seed port, the segmented lower arch 19 of the baffle guide 18 can be seen being supported by the carriage 12, and in FIG. 8, the segmented upper arch 17 of the baffle guide 18 is readily apparent. Notice also in FIG. 4 how the carriage 12 substantiates the positioning and support of the upper 17 and lower 19 arching elements of the baffle guide 18.

Referring again to FIGS. 5 and 6, it should be noted that when the baffle element 20 is fully inserted, the shoulder 22 of the baffle element properly positions the baffle by encountering the framing flange 16. Preferably, however, the framing flange will include an annular depression 15 in its anterior surface so that the shoulder will rest flush with the flange and extend no farther out from the seed port than the flange.

Also apparent in FIG. 5 are paired slots 29, which are used to secure the attachment of disk 24 when the seed port is in mode B. But because modes A and B are exclusive of each other, it is preferred that the shoulder 22 of the baffle element cover slots 29 so that it is clear during assemblage that the baffle element 20 and the disk member 24 cannot be assembled contemporaneously.

So, when the seed port is in mode B, the baffle 20 is removed from the framing flange of the seed port, and the disk 24 member is inserted on to the framing member. To improve the fit or attachment of the disk, it is preferable that the disk fit within the annular depression 15 of the framing member, not unlike the way the shoulder 22 nests in the framing flange 16 when the baffle 20 is fully inserted. To further secure the disk to the frame, the disk 24 can be fitted with attachment prongs 28, positioned diametrically opposed on the interior surface of the disk, which are sized to insert into slots 29 on the surface of depression 15 of the framing flange. Currently the prongs are a pair of opposing right angles, that extend posteriorly and that can be readily inserted into slots 29 and secured, to some extent, by slightly rotating the disk. It is to be noted that the disk need not be inextricably fitted within the frame member because it, in turn, is to be optionally removed and replaced with the baffle when the dispensing of larger seeds is desired.

In addition to the opening 26 in the center of the disk 24, which provides access to only smaller seeds, as defined by the overall shape and size of the opening, the disk can also have circumferential notches 30 positioned above and below the points of attachment of paired prongs 28. The purpose of notches 30 is to provide visual assurance that prongs 28 are semi-securely positioned within slots 29. If the prongs are not suitably positioned, slots 29 will be readily visible through notches 30.

The seed port disclosed herein can be fabricated from a variety of materials. Currently the port is being fashioned from an easily molded plastic material.

While the foregoing is a detailed and complete of the description of the preferred embodiments of the disclosed convertible seed port for a bird feeder, it should be apparent that numerous variations and modifications can be made and employed to implement the overall purpose of the device without departing from the spirit of the invention, which is fairly defined by the appended claims.

What is claimed is:

1. A seed port for use with a bird feeder, said port providing feeding access to the contents of the seed reservoir of said feeder, wherein said seed port is convertible to accommodate seeds of varying sizes, said seed port comprising:

a carriage member insertable through an opening in said reservoir and having an attachment means extending into the interior of said reservoir, and a having a framing flange defining an opening in said carriage said framing flange larger than said opening in said reservoir to limit full insertion of said carriage member;

a baffle guide attached to said framing flange and positioned above and within said opening in said carriage member;

a baffle, insertable within said guide having a shoulder positioned to impact the framing flange of the carriage member to prevent the full insertion of said baffle into said carriage member; and a disk member conforming to the size and shape of the framing flange said disk having a generally centered aperture to permit access to only small seeds within said reservoir, said disk fitting within said framing flange in the absence of said baffle.

2. The seed port according to claim 1 wherein the attachment means of said carriage member is attached to a second seed port.

3. The seed ports according to claim 2 wherein the seed ports are identical.

* * * * *